United States Patent [19]

Melvej

[11] Patent Number: 5,997,918
[45] Date of Patent: Dec. 7, 1999

[54] CORN STARCH BASED COATING COMPOSITIONS

[75] Inventor: Henning S. Melvej, Seattle, Wash.

[73] Assignee: Bunge Foods Corporation, St. Louis, Mo.

[21] Appl. No.: 09/025,217

[22] Filed: Feb. 18, 1998

Related U.S. Application Data

[63] Continuation-in-part of application No. 08/722,463, Sep. 27, 1996, abandoned.

[51] Int. Cl.$^6$ .................................................. A23L 1/0522
[52] U.S. Cl. .......................... 426/102; 426/549; 426/578; 426/637; 426/661
[58] Field of Search ..................... 426/102, 637, 426/661, 549, 578

[56] References Cited

U.S. PATENT DOCUMENTS

| | | |
|---|---|---|
| Re. 27,531 | 12/1972 | Murray . |
| 3,175,914 | 3/1965 | Vahlsing, Jr. . |
| 3,597,227 | 8/1971 | Murray . |
| 3,650,776 | 3/1972 | Tschirgi . |
| 3,703,378 | 11/1972 | Bretch ..................................... 426/661 |
| 3,751,268 | 8/1973 | Van Patten et al. . |
| 3,956,515 | 5/1976 | Moore et al. . |
| 4,199,603 | 4/1980 | Sortwell, III . |
| 4,272,553 | 6/1981 | Bengtsson et al. . |
| 4,317,842 | 3/1982 | El-Hag et al. . |
| 4,487,786 | 12/1984 | Junge . |
| 4,511,583 | 4/1985 | Olson et al. . |
| 4,542,030 | 9/1985 | Haury et al. . |
| 4,761,294 | 8/1988 | Hamann et al. . |
| 4,923,709 | 5/1990 | Slimak . |
| 4,931,296 | 6/1990 | Shanbhag et al. . |
| 4,970,084 | 11/1990 | Pirrotta et al. . |
| 5,059,435 | 10/1991 | Sloan et al. . |
| 5,141,759 | 8/1992 | Sloan et al. . |
| 5,242,699 | 9/1993 | Bednar et al. . |
| 5,279,840 | 1/1994 | Baisier et al. . |
| 5,281,432 | 1/1994 | Zallie et al. . |
| 5,302,410 | 4/1994 | Calder et al. . |
| 5,328,704 | 7/1994 | Ritch . |
| 5,393,552 | 2/1995 | Busacker et al. . |
| 5,431,944 | 7/1995 | Melvej . |
| 5,520,937 | 5/1996 | Yasosky et al. . |
| 5,622,741 | 4/1997 | Stubbs et al. . |
| 5,648,110 | 7/1997 | Wu et al. . |
| 5,849,351 | 12/1998 | Higgins et al. ......................... 426/102 |

FOREIGN PATENT DOCUMENTS

| | | |
|---|---|---|
| 356 492 | 4/1980 | Austria . |
| 0026565 | 4/1981 | European Pat. Off. . |
| 1454341 | 9/1966 | France . |
| WO 85/01188 | 3/1985 | WIPO . |
| WO 88/06007 | 8/1988 | WIPO . |

*Primary Examiner*—Helen Pratt
*Attorney, Agent, or Firm*—Gerstman Ellis & McMillin, Ltd.

[57] ABSTRACT

Food coating compositions are disclosed which are based on a high percentage of corn starch. The compositions preferably contain lower percentages of tapioca starch. The compositions may also contain potato starch, tapioca dextrin, rice flour, leavening agent, xanthan gum, whey or nonfat milk, colorants and flavorants. The coatings may be advantageously used to coat vegetable products, including potato, to enhance flavor and other characteristics.

11 Claims, No Drawings

CORN STARCH BASED COATING COMPOSITIONS

CROSS REFERENCE TO RELATED APPLICATION

This application is a continuation-in-part of application Ser. No. 08/722,463, filed Sep. 27, 1996, now abandoned.

FIELD OF THE INVENTION

The present invention concerns a novel coating material for food products and food products coated with this material.

BACKGROUND OF THE INVENTION

Coating materials for food products and coated food products are known including those for coated french fry potato products and other vegetables. The coatings typically available in the market and in use contain a high level of flour (wheat, corn, etc.) or starch, depending on the purpose of the coater. In a thin coater designed to minimize alteration of the food product's original appearance, it is felt that substantial benefits can be achieved through the use of coating compositions containing more starch than flour. It is also felt that substantial benefits can be achieved through the use of coating compositions containing more corn starch than potato starch and through the addition of tapioca starch.

Corn starches are more available and their quality is generally more consistent than potato starches. The potato starches typically used in the United States are usually derived and modified from waste water from potato processors. This raw material supply is limited and quality is inconsistent. Other potato starches are produced from whole potatoes in Europe, but quality of these potato starches may be inconsistent due to variations in crop year quality and shipping costs may add to their expense. Perhaps for these reasons, potato starches are generally more expensive and less cost efficient than corn starches.

The higher quality and greater uniformity of modified corn starches results in a coating that is consistent and more easily applied to products without, or with greatly reduced, sticking and lumping. This permits the manufacturers to increase processing line through-put improving product volume and efficiencies. In addition, these qualities carry over to end users, allowing them to finish fry the product from frozen or thawed conditions without the product sticking together and without significant breakdown of the coating.

Products coated with modified corn starch based coating compositions may also display better holding characteristics under and away from the heat lamp after frying. High wheat flour or corn flour based thin coaters can become soft and chewy under the heat lamp, while high potato starch based coated products may have a tendency to turn tough and leathery. On the other hand, some corn starch based coated products remain tender yet crisp. This results in less waste for the restaurant operators and ensures the end customers of a quality product even if they reheat the product in an oven when they get to their destination.

Further benefits are achieved through the use of tapioca starch in addition to corn starch. The flour portion can be reduced or eliminated entirely. In this way, a gluten-free coating that improves texture and holding time can be provided while the risk of allergic reaction by a protein sensitive person is minimized. However, the use of large percentages of high amylose starches can increase reticulation and toughness in thin coated products.

An object of the present invention is to provide a coating and coated products that have consistent, favorable taste and use characteristics.

Another object of the present invention is to provide a coating that increases crispness and helps maintain eating quality over an extended period of time.

Another object of the present invention is to provide a coating that does not mask or interfere with the natural flavor or appearance of food but is receptive to seasonings and/or flavorants.

Another object of the present invention is to produce a coating that is easy and economical to use.

Other objects and advantages of the present invention will become apparent as the description proceeds.

SUMMARY OF THE INVENTION

In accordance with the present invention, food coatings containing at least about 50% starch, especially chemically cross-linked modified corn starch, are provided. The coatings may also contain chemically cross-linked and stabilized modified tapioca starch. They may also contain modified potato starch and dextrins, especially tapioca dextrin. The amount of corn starch is greater than the amount of tapioca starch and the amount of potato starch. The ratio of corn starch to tapioca starch is preferably at least 2:1 and the ratio of corn starch to potato starch is preferably at least 2:1. The food coating may further contain ingredients such as leavening agents, xanthan gum, colorants and flavorants. The food coating is recommended for use as an aqueous batter and is particularly suited for french fry potato products. It may be advantageously used as a coating for potatoes which are parfried and which can be stored and sold in frozen form.

A more detailed explanation of the invention is provided in the following description and claims.

DETAILED DESCRIPTION OF THE ILLUSTRATIVE EMBODIMENT

The illustrative embodiments of the invention consist of coating compositions which can be used to coat potato products, particularly, potato strips. These coatings, when used to enrobe a potato product, greatly improve the eating and holding qualities of the finished product.

The coatings may be used to coat other food products, especially vegetables. This includes zucchini, sweet potatoes, onions, okra, mushrooms, peppers and string beans. Of course, this list provides only a small sampling of foods which could be coated using the coatings of the present invention.

Vegetables and other food products may be processed using common practices in accordance with their requirements. Typically, vegetables such as potatoes are washed and cut, partially blanched in hot water (150°–200° F.) for 2 to 20 minutes, then surface dried in hot air (120°–200° F.) for 6 to 20 minutes. Optionally, the product is immersed in a hot, aqueous solution containing ingredients designed to flavor, color or prevent discoloration of the finished product.

After drying, the food product is coated with an aqueous slurry containing about 25% to 55% of the dry mix and about 45% to 75% water by weight. The dry portion contains mainly starch. The dry starch portion preferably contains about 30% to 68% by weight of a chemically cross-linked, modified (CCM) corn starch and most preferably contains about 40% to 60%. The dry starch portion may also contain 5% to 26% by weight of a chemically crosslinked and stabilized modified (CCSM) tapioca starch and most preferably contains about 11% to 17%. The CCM corn starch to CCSM tapioca starch ratio is at least 2 to 1 and preferably is at least 3 to 1.

Chemically crosslinked, modified (CCM) corn starch is preferred over high amylose or modified high amylose corn starch for providing viscosity in the aqueous slurry and uniform structure and crispness in the finished product. Large amounts of high amylose or modified high amylose corn starch can increase costs and cause roughness and toughness in the finished product. The high amylose portion is 20% or less and is preferably less than 10% by weight of the dry portion.

Chemically crosslinked and stabilized modified (CCSM) tapioca starch is preferred as a replacement for rice flour, high amylose starch or modified high amylose starch. CCSM tapioca starch provides a crisp, short bite without greasy mouth feel or roughness in the finished product appearance. Rice flour can cause greasiness and roughness in the finished product appearance and can contribute to toughness in extended hold products.

The coating preferably contains other ingredients, including modified potato starch, tapioca dextrin, salt, leavening agents such as sodium acid pyrophosphate and sodium bicarbonate, and xanthan gum. Modified potato starch can provide a variance in mouth feel and texture. If the percentage of potato starch is too high in relation to the corn starch, the final product will have a rough surface, tough and leathery eating qualities, and reduced holding time under and away from the heating lamp. Preferably, the potato starch used is a ungelatinized, modified potato starch. The amount of corn starch, preferably CCM corn starch, is greater than the amount of potato starch. The ratio of CCM corn starch to potato starch is preferably at least 2:1 and most preferably at least 3:1.

Tapioca dextrin by itself and, more importantly, in relative ratio with the leavening agents provides a "tender" bite and mouth feel to the finished product. The leavening agents, sodium acid pyrophosphate and sodium bicarbonate, provide carbon dioxide gas, which leavens the coating when it is exposed to heat during parfrying of the coated food product. The total amount as well as the type of leavening agent and the relative ratio of the different types, plays an important role in the crispiness of these formulations. The amount of dextrin, preferably tapioca dextrin, is about 5 to 20%, preferably 11–17%, by weight of the dry portion. The ratio of dextrin to leavening agents is about 6:1 to 12:1 and preferably is about 10:1.

The xanthan gum provides viscosity and film-forming attributes to the aqueous slurry, which contributes to the unique texture and uniform appearance of the finished product.

The coating may also contain colorants and flavorants, including salt, spices and seasoning.

The slurry may be prepared by mixing the dry blended ingredients with 38° to 75° F. water by conventional methods. The aqueous slurry may be held between 50° and 75° F. for 5 minutes to 2.5 hours, preferably with continuous stirring or low level agitation.

The slurry may be applied to food products by spraying, immersion or other conventional means. Any excess coating may be drained and/or blown off with air prior to parfrying.

The coated vegetables or food products may be parfried using conventional methods. For potatoes, they are preferably parfried for 30 to 90 seconds in hot oil at a temperature from 330° to 390° F. Parfried product is frozen, packaged, distributed and held frozen until ready to be used.

The coated product is finished by frying or baking. Frozen product may be thawed partially or completely before finishing. The finished food product has a pleasing, natural-looking appearance, a crisp exterior with a moist interior, and a tender, not tough, bite. The coated foods maintain these qualities longer than non-coated foods when held for extended periods.

Significantly, the finished product maintains or regains crispness without toughness when consumed after being held under a heat lamp, or held under a heat lamp, then cooled to room temperature, or held under a heat lamp, cooled and then reheated. This is of great benefit for products that are sold in deli or drive-thru situations. By prolonging the quality of the finished product, there is decreased waste for the restaurant operator and high consumer satisfaction.

Seven examples of specific formulations for dry coating mixes are set forth in Table 1 in which all figures are given in weight percentages.

TABLE 1

| Example # | 1 | 2 | 3 | 4 | 5 | 6 | 7 |
| --- | --- | --- | --- | --- | --- | --- | --- |
| Corn Starch | 68.78 | 58.44 | 56.84 | 56.24 | 56.00 | 50.16 | 51.12 |
| Potato Starch | 5.24 | 15.80 | 14.89 | 15.40 | 15.30 | 15.29 | 15.24 |
| Rice Flour | 15.26 | 15.32 | 14.38 | 14.50 | 14.40 | 14.38 | 15.10 |
| Dextrin | 6.96 | 6.95 | 10.47 | 10.50 | 10.88 | 14.64 | 14.36 |
| Salt | 2.47 | 2.20 | 2.13 | 2.12 | 2.10 | 2.22 | 2.26 |
| Sodium Acid Pyrophosphate | 0.76 | 0.76 | 0.71 | 0.73 | 0.73 | 1.33 | 0.84 |
| Sodium Bicarbonate | 0.50 | 0.50 | 0.55 | 0.48 | 0.48 | 0.87 | 0.55 |
| Xanthan Gum | 0.03 | 0.03 | 0.03 | 0.03 | 0.11 | 0.11 | 0.03 |
| Nonfat Dry Milk | — | — | — | — | — | 1.00 | — |
| Whey Powder | — | — | — | — | — | — | 0.50 |
|  | 100.00 | 100.00 | 100.00 | 100.00 | 100.00 | 100.00 | 100.00 |

The corn starch contributes to the viscosity of the batter and adherence and crispiness of the coating. In these examples, the corn starch used includes a high percentage of ungelatinized, modified corn starch; a lesser percentage of ungelatinized, high amylose corn starch and a small percentage of ungelatinized, modified and high amylose corn starch. If the percentage of ungelatinized, modified and high amylose corn starch is too high, the final product will have too much toothpack, reticulation (blisters on surface) and it will have tough and leathery eating qualities. Suitable corn starches are available from National Starch and Chemical Company, Food Products Division, Bridgewater, N.J.

In the formulations shown above as Examples 1–7, the percentages of the three types of corn starch used were as set forth below in Table 2 in which all figures are given in weight percentages of the total dry coating mixes.

TABLE 2

| Description | Example # | | | | | | |
|---|---|---|---|---|---|---|---|
| | 1 | 2 | 3 | 4 | 5 | 6 | 7 |
| Modified Corn Starch | 47.43 | 37.02 | 45.90 | 44.99 | 44.65 | 46.10 | 47.53 |
| High Amylose Corn Starch | 20.25 | 20.32 | 9.92 | 10.00 | 10.10 | 2.46 | 2.51 |
| Modified and High Amylose Corn Starch | 1.10 | 1.10 | 1.02 | 1.25 | 1.25 | 1.60 | 1.08 |
| Total Corn Starch | 68.78 | 58.44 | 56.84 | 56.24 | 56.00 | 50.16 | 51.12 |

These coatings can be used in accordance with the following process to coat potatoes in order to produce a coated french fry product. In general, potatoes are cleaned, peeled, portioned, water blanched, dried, batter coated, parfried, frozen, packaged, placed in storage freezer and distributed.

The dry mix is used in the form of an aqueous batter containing between about 28% to about 40% of the dry mix and about 72% to about 60% water. The dry mix and water are mixed together to form a batter in a batter mixing system which can be either of the continuous mixing or batch mixing type. The batter temperature was about 60° F. to about 70° F.

The batter may then go to a holding tank in which it is preferably stirred continuously and preferably kept at about 60° F. to about 70° F. From the holding tank, the batter is pumped to a batter applicator which applies the batter onto the potato product by forming a liquid curtain of batter which can cover the top and sides of the product. The underside and lower portions of the product are covered by a batter puddle maintained directly under the moving product belt. Any excess batter is removed by means of adjustable "air knifes" or blow-off tubes mounted directly above and under the moving product belt.

As soon as the excess batter has been removed from the potatoes, they are deposited directly into a deep fat fryer where they are "parfried" for a very short time, approximately 45–60 seconds at about 350° F. to about 375° F. After they exit the fryer, the product is I.Q.F. frozen ("Individually Quick Frozen") and then packaged and distributed.

The product is usually reconstituted in a deep fat fryer at a temperature of about 350–360° F. for between about 2-½ minutes to about 2-¾ minutes. The product should then be drained for about 1–2 minutes. Alternatively, the product can be reconstituted by baking in an oven for about 10–12 minutes at about 425° F.

Three examples of formulations for dry coating mixes are set forth in Table 3 in which all figures are given as weight percentages.

TABLE 3

| Example # | 8 | 9 | 10 |
|---|---|---|---|
| Rice Flour | 14.50 | — | — |
| CCM Corn Starch | 31.49 | 31.48 | 44.98 |
| CCSM Tapioca Starch | — | 14.49 | 14.49 |
| High Amylose Corn Starch | 20.00 | 20.00 | 6.50 |
| Modified High Amylose Corn Starch | 1.25 | 1.25 | 1.25 |
| Modified Potato Starch | 15.40 | 15.39 | 15.39 |
| Tapioca Dextrin | 14.00 | 14.00 | 14.00 |
| Salt | 2.12 | 2.12 | 2.12 |
| Sodium Acid Phosphate | 0.73 | 0.73 | 0.73 |
| Sodium Bicarbonate | 0.48 | 0.48 | 0.48 |
| Xanthan Gum | 0.03 | 0.06 | 0.06 |
| Total | 100.00 | 100.00 | 100.00 |

The dry mix of Example 8 contains rice flour and high amylose corn starch, in addition to CCM corn starch. In the dry mix of Example 9, the rice flour has been replaced with CCSM tapioca starch. In the dry mix of Example 10, the rice flour and a portion of the high amylose corn starch have been replaced with CCSM tapioca starch and CCM corn starch.

Suitable corn starch, tapioca starch and tapioca dextrin are available from National Starch and Chemical Company, Food Products Division, Bridgewater, N.J. Suitable CCM corn starch is sold under the designations "National 134B" and "National 4180." Suitable CCSM tapioca starch is sold under the designations "Purity 87." Suitable high amylose corn starch (which also contributes tapioca dextrin) is sold under the designation "National 77-1727." Suitable modified high amylose corn starch is sold under the designation "National 77-1789." Suitable tapioca dextrin is sold under the designation "Crisp Coat SC." Suitable potato starch is sold under the designation "Perfectamyl FFC" by Avebe America, Inc., Princeton, N.J.

The coatings of Examples 8–10 were used in accordance with the following process to coat potatoes and produce a coated french fry product.

Russet Burbank potatoes were washed, peeled and cut into 5/16" strips, rinsed in cold water, then drained. The strips were then blanched 9 minutes in a steam jacketed kettle containing a solution of 0.35% by weight sodium acid pyrophosphate at 178° F., then drained. The strips were then placed on drying trays and dried in a forced air, rotating rack oven at 140° F. until a 14% moisture weight loss was achieved.

The aqueous slurry was prepared using 42% by weight dry ingredients as listed in Table 3 and 58% by weight water.

The dry blended ingredients were mixed with cold water in a 5 quart Hobart mixer with a whip attachment. The water and dry ingredients were mixed for 1 minute on speed 1 and the bowl was scraped. Then, the ingredients were mixed for 4 additional minutes on speed 2. Target temperature of the final mix was 55° F. to 60° F.

The slurry was applied by immersing the strips in the slurry. Then, the coated strips were transferred to a wire rack to drain. Excess coating was blown off with air.

The coated strips were parfried in partially hydrogenated soybean oil for 55 seconds at 380° F., then removed from the oil and drained on wire trays. The trays were transferred to a blast freezer and frozen at −20° F. The frozen product was packaged and stored in a freezer at −10° F. to −20° F.

As controls, non-coated potato strips were processed in an identical manner, except the coating and coating step were eliminated.

The frozen strips were reconstituted by frying in partially hydrogenated soybean oil for 2 minutes, 45 seconds at 350° F. After draining, a portion of the fried strips were placed on a tray in ambient air and allowed to cool for 25 minutes. The other portion was placed on a perforated pan under a heat lamp at 140° to 150° F. for 10 minutes. The product was then removed from the heat lamp and cooled in ambient air. After 20 minutes of cooling, the product was transferred to a pan lined with aluminum foil and reheated in a conventional oven for 5 minutes at 425° F. The reheated products were then allowed to cool in ambient air. The products were evaluated for crispness and toughness. Total elapsed time after frying for the extended hold under heat lamp samples was 45 minutes.

Throughout the holding under heat lamp and cooling stages, all the coated fries were crispier and had less shrinkage than the non-coated fries. Upon reheating and cooling, the non-coated fries lost all crispness, became tough and demonstrated a large amount of shrink. The Example 8 coated samples containing rice flour and modified high amylose corn starch were the toughest and most visible, or roughest, of the coated samples. The Example 9 coated samples containing modified high amylose corn starch and CCSM tapioca starch, but no rice flour, were the next toughest and roughest. The Example 10 coated samples in which CCM corn starch replaced much of the modified high amylose starch were the crispiest and least tough and least rough-looking, and also demonstrated the least amount of shrink in the finished product. These three examples demonstrate improvements in texture, appearance and holding qualities by using CCM corn starch to replace a significant portion of high amylose starch (approximately 67.5%) and CCSM tapioca starch to replace up to 100% by weight of rice flour.

In Examples 11–13, all potatoes were processed in a manner similar to the process used in Examples 8–10, except the aqueous slurry contained 32% of the dry mix coating formulations of Table 4 in which all figures in weight percentages and 68% cold water.

TABLE 4

| Example # | 11 | 12 | 13 |
|---|---|---|---|
| Rice Flour | 14.49 | 14.95 | — |
| CCM Corn Starch | 31.49 | 46.99 | 31.47 |
| CCSM Tapioca Starch | — | — | 14.48 |
| High Amylose Corn Starch | 20.00 | 1.62 | 19.99 |
| Modified High Amylose Corn Starch | 1.25 | 1.59 | 1.25 |
| Modified Potato Starch | 15.39 | 15.70 | 15.38 |
| Tapioca Dextrin | 13.99 | 14.60 | 13.99 |
| Salt | 2.12 | 2.24 | 2.12 |
| Sodium Acid Pyrophosphate | 0.73 | 1.33 | 0.73 |
| Sodium Bicarbonate | 0.48 | 0.87 | 0.48 |
| Xanthan Gum | 0.06 | 0.11 | 0.11 |
| Total | 100.00 | 100.00 | 100.00 |

The formulation of Example 11 contains mostly corn starch with a majority being CCM corn starch. The ratio of CCM corn starch to high amylose corn starch is about 1.5:1. In Example 12, the high amylose corn starch has been reduced approximately 90% and replaced primarily with additional CCM corn starch. The formulation of Example 13 contains levels of CCM corn starch and high amylose corn starch similar to Example 11, but the rice flour has been replaced by CCSM tapioca starch.

The coated fries were compared to non-coated controls as in other examples. French fried potatoes coated with the coating of Example 11, which contained high amounts of both rice flour and high amylose corn starch, were the most visible (reticulated) and toughest of the coated fries. French fried potatoes coated with the coating of Examples 12 and 13 had a smoother, less visible coating and had a more uniform, less tough texture when compared to the fries with coatings as in Example 11.

Examples 11–13 illustrate the improvements possible in french fry texture when coating fries with a coating containing a high level of corn starch. These examples also demonstrate significant improvements in coated fry crispness and holding capabilities when substituting CCM corn starch for high amylose corn starch and CCSM tapioca starch for rice flour.

Table 5 describes three dry mix coating formulations given in weight percentages. The formulas demonstrate both increases in the amount by weight of CCM corn starch in the total dry mix formula and the ratio of CCM corn starch to CCSM tapioca starch. The ratios of CCM corn starch to CCSM tapioca starch are about 2.7 to 1.0 in Example 14 and about 4.7 to 1.0 in Example 15. In Example 16, the CCSM tapioca starch is completely replaced with CCM corn starch.

The dry coatings of Examples 14–16 were mixed and applied in the same manner that coatings of Examples 8–10 were mixed and applied. The potatoes were also processed and the products evaluated in the same manner.

TABLE 5

| Example # | 14 | 15 | 16 |
|---|---|---|---|
| CCM Cornstarch | 45.54 | 51.53 | 62.53 |
| CCSM Tapioca Starch | 17.00 | 11.00 | — |
| High Amylose Corn Starch | 1.78 | 1.78 | 1.78 |
| Modified High Amylose Corn Starch | 0.75 | 0.75 | 0.75 |
| Modified Potato Starch | 15.45 | 15.45 | 15.45 |
| Tapioca Dextrin | 15.35 | 15.36 | 15.36 |
| Salt | 2.50 | 2.50 | 2.50 |
| Sodium Acid Pyrophosphate | 0.94 | 0.94 | 0.94 |
| Sodium Bicarbonate | 0.63 | 0.63 | 0.63 |
| Xanthan Gum | 0.06 | 0.06 | 0.06 |
| Total | 100.00 | 100.00 | 100.00 |

The surface of all the french fry potato products coated with the formulations of Examples 14–16 were natural-looking, compared to the non-coated control. All coated samples were crispier out of the fryer and maintained their crispness and shape longer than the non-coated fries when evaluated under extended hold conditions.

French fries coated with the formulations of Examples 15 and 16 were more crisp than french fries coated with the formulation of Example 14 throughout the extended hold conditions. Although french fries coated with the formulations of Examples 15 and 16 were similar in crispness, those coated with the formulation of Example 16 were more uniformly crisp throughout the extended hold conditions, particularly after holding under a heat lamp and after baking, but were slightly harder and tougher than those from Example 15. Examples 14–16 demonstrate improved texture and holding qualities over a non-coated french fry without significantly affecting the natural appearance of the potato product.

Examples 17 and 18 compare flour-based coaters to starch-based coaters. Russet Burbank potatoes were processed as in previous Examples 8–10 except the starch slurries contained the dry mix formulations listed in Table 6. All figures in Table 6 are in weight percentages.

TABLE 6

| Example # | 17 | 18 |
| --- | --- | --- |
| Wheat Flour | 49.92 | — |
| Rice Flour | 4.15 | — |
| CCSM Tapioca Starch | — | 17.00 |
| CCM Corn Starch | 23.07 | 45.54 |
| High Amylose Corn Starch | 6.11 | 1.78 |
| Modified High Amylose Corn Starch | — | 0.75 |
| Modified Potato Starch | 7.00 | 15.45 |
| Tapioca Dextrin | 4.28 | 15.35 |
| Salt | 2.98 | 2.5 |
| Sodium Acid Pyrophosphate | 1.09 | 0.94 |
| Sodium Bicarbonate | 0.95 | 0.63 |
| Flavor | 0.25 | — |
| Color | 0.15 | — |
| Guar Gum | 0.05 | — |
| Xanthan Gum | — | 0.06 |
| Total | 100.00 | 100.00 |

The frozen strips were reconstituted and evaluated as in the previous Examples 8–10. Additional samples were baked from frozen in a conventional oven for 18 minutes at 425° F.

French fries coated with the starch-based formulation of Example 18 demonstrated a crispier, louder bite, and were less tough than the flour based samples of Example 17, especially after baking and cooling. Also, the appearance or product identity of the fries coated with formulation of Example 18 was closer to that of a natural french fry than the fries coated with the formulation of Example 17. Lastly, the natural potato flavor of the finished products coated with the formulation of Example 18 was stronger and cleaner tasting than in the products coated with the formulation of Example 17. The french fries coated with the formulation of Example 17 tasted mainly of wheat and oil.

The preferred embodiment is a dry mix containing 30–68% corn starch, preferably 40–60%; 0–26% tapioca starch, preferably 11–17%; 5–28% potato starch, preferably 11–17% 5–20% tapioca dextrin, preferably 11–17%. The amount of corn starch, preferably CCM corn starch, is greater than the amount of potato starch and the ratio of corn starch to potato starch is preferably at least 2:1. The ratio of CCM corn starch to tapioca starch, preferably CCSM tapioca starch, is preferably at least 2:1 and most preferably at least 3:1. The amount of high amylose corn starch is 20% or less and preferably less than 10%. The ratio of CCM corn starch to high amylose corn starch is at least 1.5:1 and preferably at least 4:1. The CCM can replace up to 97% of the high amylose corn starch.

It is anticipated that the coating will be distributed as a dry mix. It may be prepared by mixing the ingredients in equipment for mixing dry powders. After being thoroughly mixed to form a substantially uniform mixture, the mixture may be placed and sealed in bags for distribution.

When the present invention is used, the finished product attains a very high level of quality in terms of a natural appearance and wholesome potato flavor and a tender, crisp exterior and a moist, tender interior. These qualities are maintained throughout extended holding conditions.

Although illustrative embodiments of the invention have been shown and described, it is to be understood that various modifications and substitutions may be made by those skilled in the art without departing from the novel spirit and scope of the invention.

What is claimed is:

1. A single-layer, non-breading coated potato product wherein the coating comprises at least about 50% starch wherein about 30–68% of said starch is a chemically cross-linked, modified corn starch.

2. The coated potato product of claim 1 wherein said starch comprises up to 26% chemically cross-linked and stabilized modified tapioca starch.

3. The coated potato product of claim 1 wherein said starch comprises 5–28% potato starch.

4. The coated potato product of claim 1 wherein said coating further comprises 5–20% tapioca dextrin.

5. A frozen, non-breaded, single-layer coated food product comprising vegetable pieces wherein said coating comprises at least about 50% starch with at least about 30–68% of said starch comprising a chemically cross-linked modified corn starch.

6. The food product of claim 5 wherein the coating comprises up to 26% chemically cross-linked and stabilized modified tapioca starch.

7. The coated food product of claim 5 wherein said vegetable comprises potato.

8. A single layer, non-breading food coating for vegetable pieces comprising at least about 50% starch wherein said starch comprises tapioca starch band about 30% to 68% of said starch is corn starch and the ratio of corn starch to tapioca starch is at least about 2:1.

9. A single-layer, non-breading food coating for vegetable pieces comprising about 50% starch wherein said starch comprises potato starch and about 30–68% of said starch is corn starch.

10. The food coating of claim 9 wherein the ratio of corn starch to potato starch is at least about 2:1.

11. A single layer, non-breading coating for vegetable pieces comprising at least about 50% starch wherein about 30% to 60% of said starch is corn starch and the ratio of chemically cross-linked modified corn starch to high amylose corn starch is at least 4:1.

* * * * *